May 4, 1954     S. P. LOVELL ET AL     2,677,646

UNIT FOR BACTERIAL ANALYSIS

Filed March 22, 1952

INVENTOR.
Stanley P. Lovell &
BY   John H. Burk.
Kenway, Jenney, Witter & Hildreth.
Att'ys.

Patented May 4, 1954

2,677,646

UNITED STATES PATENT OFFICE 2,677,646

UNIT FOR BACTERIAL ANALYSIS

Stanley P. Lovell, Newtonville, and John H. Bush, Needham, Mass., assignors to Lovell Chemical Company, Watertown, Mass., a corporation of Massachusetts Application March 22, 1952, Serial No. 278,094

4 Claims. (Cl. 195—139)

This invention comprises a new and improved unit for bacterial analysis. It includes in its construction a protective transparent container, a frame-mounted bacterial filter which may be temporarily removed from the unit and used with filtering apparatus in the field to collect bacteria to be analyzed, and a nutrient-supplying element arranged to be held in face-to-face contact with the filter and to promote the growth of bacteria thereon, all while securely enclosed and safeguarded from contamination and while maintained in condition favorable to the growth or development of the bacteria captured upon the filter.

The unit of my invention possesses the great advantage that it permits and facilitates the taking of filtered samples in the field, proceeding immediately to the incubation of the filtered microorganisms, and an early detection and determination of their nature. For example, in the detection of organisms destructive to plants, animals or humans or in the analysis of water supply, the unit may be relied upon to make available in any location a sterilized frame-supported filter. This may be removed from its enclosure and affixed to the discharge outlet of a funnel and a standard liquid sample immediately passed through the filter. The wet filter with its deposited micro-organisms may then be returned to its enclosure, safeguarded against contamination, and held firmly in face-to-face contact with an underlying nutrient sheet. The closed or sealed container may now be conveyed to the laboratory without the necessity of refrigeration or other exacting precautions. In many cases the heat of the investigator's body may be made effective to stimulate incubation so that the bacteria will have become developed to the stage of identification by the time the unit is delivered for microscopic examination.

The multipore filter with which the present invention deals is of such delicate structure that its usefulness is impaired by the slightest casual contact. Heretofore such filters could be only handled with forceps and with the most extreme care. In accordance with the present invention, however, the filter is assembled with an open frame which not only acts as a protective wall for the filter itself, but supplies convenient and sturdy means for manipulating the filter with little or no danger of contact to its critical area. The frame has the further function of holding the used filter sheet securely against movement within its enclosure and in uniform face-to-face contact with an underlying nutrient sheet.

These and other features of the invention will be best understood and appreciated from the following description of a preferred embodiment thereof, selected for purposes of illustration and shown in the accompanying drawings in which.

Figure 1:
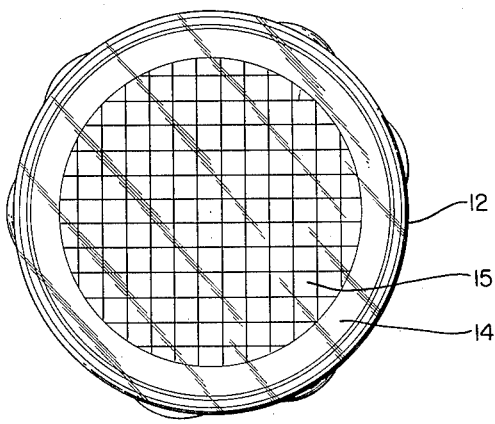
Fig. 1 is a plan view of the unit on an enlarged scale.
Figure 2:
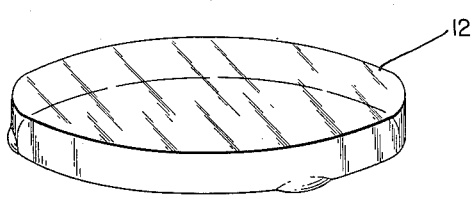
Figs. 2 and 5 are views in perspective of the cover and box enclosure.
Figure 3:
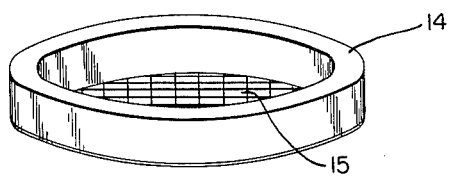
Fig. 3 is a view in perspective of the frame-mounted filter sheet.
Figure 4:
Fig. 4 is a similar view of the nutrient disk.
Figure 5:
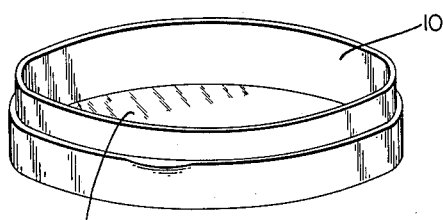

The enclosure herein shown comprises a circular box having an upstanding annular wall 10 provided with a circumferential shoulder to receive the cover and a bottom 11. Cooperating with the box is a close-fitting circular cover 12 shaped to rest upon the shoulder of the wall of the box. The box and its cover may be made of transparent resinous material such as polystyrene, Lucite or the like. As herein shown, both the cover and the body of the box are provided with peripheral lugs to facilitate removal of the cover. While a circular receptacle has the advantage of simulating accepted glassware, it is obvious that square or rectangular units would serve as well.

In the assembled unit a circular nutrient disk 13 is shaped to fit within the box and cover its bottom 11. The nutrient disk may be of any chemically inert cellulose sheet material impregnated with a nutrient composition in the concentration for best growth development. Generally, the concentration of the nutrient will be two to four times higher than that customarily used in standard agar formulations. Peptone, yeast autolysate, potassium phosphate and sodium chloride are the ingredients of one satisfactory nutrient composition. In another composition dextrose is the active ingredient, and other equivalent compositions are known and available to those familiar with bacterial analysis.

General practice has been to apply the nutrient by making a broth in the laboratory and by adding this nutrient medium to the field to be nourished at the time the organism or suspected sample is collected.

By our novel unit it becomes possible to pretreat our nutrient disk or pad with a proper growth-promoting liquid, then to dehydrate it in situ in the pad and thus supply the technician with a unit which is ready to use upon the addition of sterile or distilled water to the underlying nutrient pad.

The bacterial filter comprises a circular disk 15 of the general type disclosed in U. S. Patent No. 1,421,341, June 27, 1922, Zsigmondy, that is to say, a sheet formed by dissolving a cellulose ester in a solvent mixture and evaporating the solution in a moist atmosphere. This type of filter sheet is herein designated as a "multipore filter." In the unit herein disclosed a disk 15 of this material is cut of a diameter corresponding to the internal diameter of the circular wall 10 and is adhesively attached by cement or otherwise to the lower edge surface of a ring 14 also corresponding in diameter to the internal diameter of the wall. The ring 14 is substantially rectangular in cross section, being in actual practice about $\frac{3}{16}$" in width and of such height as to fit snugly within the closed box, that is to say, when the ring is enclosed the cover 12 holds it down in fixed position with the margins of the nutrient disk 13 and the filter disk 15 in compression against the bottom 11 of the box. The filter disk 15 is herein shown as ruled in squares, each corresponding to $\frac{1}{100}$ of its exposed area as a convenience in counting the number of developed colonies of bacteria observed thereon. The ring 14 is preferably constructed of the same transparent material as the box itself.

For certain types of work it is preferred to use the multiporous filter membrane alone, that is, not mounted on a rim. In such cases, the multiporous filter disk is inserted by forceps upon the freshly-charged nutrient pad, being careful that no occluded air pockets are formed between the two sheets or films and the natural suction or surface tension of the aqueous liquid holds the filter securely to the nutrient pad and both to the inner surface or base of the receptacle.

The filter disk on account of its porosity is highly absorbent and consequently will retain sufficient moisture after use to make uniform wetting contact with the underlying nutrient disk and to create a moist atmosphere within the enclosure of the box. Under these conditions the nutrient is withdrawn into the filter by capillary action and incubation of the bacteria upon the exposed surface of the filter disk is at once initiated.

Another of the many advantages of our unit is that it is unbreakable in normal use. Where pathogenic organisms are collected for identification it is extremely hazardous if their container is cracked or broken and fatalities have resulted from such accidents. Our invention thus provides an unbreakable bacterial collector, grower and pocket incubator that may be used in the field with entire safety.

Having thus disclosed our invention and described in detail an illustrative embodiment thereof, we claim as new and desire to secure by Letters Patent:

1. A unit for bacterial analysis comprising a circular box of transparent plastic having an annular wall and a removable close-fitting cover, a nutrient disk of inert cellulose covering the bottom of the box, a transparent ring substantially rectangular in cross section fitted within the box, and a circular multipore filter disk which will not permit the passage of micro-organisms therethrough, said disk being cemented to the lower circular face of the ring, engaging said nutrient disk in direct face-to-face contact and held in place by the cover and wall of the box.

2. A unit for bacterial analysis comprising a box of transparent plastic material having an upright wall and a removable close-fitting cover, a nutrient sheet of inert cellulose covering the bottom of the box, an open frame fitted within the box, and a multipore filter sheet which will not permit the passage of micro-organisms therethrough, said sheet being attached to the lower edge of the frame and held thereby in face-to-face contact with the nutrient sheet by the cover and wall of the box.

3. A unit of the character defined in claim 2 in which the nutrient sheet and the frame coincide in contour and the sheet is thus held against the bottom of the box by the overlying frame.

4. A pocket incubator for bacterial analysis comprising a multipore filter which will not permit the passage of micro-organisms therethrough, a nutrient pad containing dehydrated growth-promoting ingredients underlying the filter, and an unbreakable covered container in which the filter and nutrient pad are secured in face-to-face contact with each other by their assembled relation therein.

References Cited in the file of this patent

UNITED STATES PATENTS

| Number | Name | Date |
|---|---|---|
| 1,421,341 | Zsigmondy | June 27, 1922 |
| 2,348,448 | Brewer | May 1944 |

FOREIGN PATENTS

| Number | Country | Date |
|---|---|---|
| 957,354 | France | Dec. 1946 |

OTHER REFERENCES

Science, vol. 88, page 412, October 1938.